(12) United States Patent
Keithley et al.

(10) Patent No.: US 6,407,830 B1
(45) Date of Patent: Jun. 18, 2002

(54) SENSOR ASSEMBLIES FOR COLOR OPTICAL IMAGE SCANNERS OPTICAL SCANNER AND METHODS OF SCANNING COLOR IMAGES

(75) Inventors: Douglas G. Keithley, Boise; Brent D. Rasmussen, Meridian, both of ID (US)

(73) Assignee: Hewlett-Packard Co., Palo Alto, CA (US)

( * ) Notice: Subject to any disclaimer, the term of this patent is extended or adjusted under 35 U.S.C. 154(b) by 0 days.

(21) Appl. No.: 09/245,278

(22) Filed: Feb. 5, 1999

(51) Int. Cl.[7] .................................................. H04N 1/46

(52) U.S. Cl. ..................... 358/514; 382/167; 250/208.1

(58) Field of Search ................................. 358/514, 505, 358/500, 515, 516; 382/167, 240; 250/208.1, 226, 578.1

(56) References Cited

U.S. PATENT DOCUMENTS

| 5,483,053 | A | | 1/1996 | Johnson et al. ............. 250/226 |
| 5,642,197 | A | * | 6/1997 | Tuhuro ....................... 250/226 |
| 5,710,872 | A | | 1/1998 | Takahashi et al. .......... 395/109 |
| 5,745,607 | A | | 4/1998 | Maeda ........................ 382/240 |
| 5,753,906 | A | | 5/1998 | Gennetten ................... 250/226 |
| 5,773,814 | A | * | 6/1998 | Phillips .................... 250/208.1 |

* cited by examiner

Primary Examiner—Jerome Grant, II
Assistant Examiner—Negussie Worku

(57) ABSTRACT

Color optical image scanners, optical scanners, and methods of scanning color images are described. In one embodiment, variations in a velocity profile of a moving object to be scanned are compensated for by selecting for illumination during greater velocity regions, colors having lesser degrees of sensitivity to a human eye. In another embodiment, manipulation of color planes of a scanned object takes place to provide improved images with reduced color artifacts.

20 Claims, 8 Drawing Sheets

(2 of 8 Drawing Sheet(s) Filed in Color)

SENSOR ASSEMBLIES FOR COLOR OPTICAL IMAGE SCANNERS OPTICAL SCANNER AND METHODS OF SCANNING COLOR IMAGES

FIELD OF THE INVENTION

This invention relates to sensor assemblies for color optical image scanners, optical scanners, and methods of scanning color images.

BACKGROUND OF THE INVENTION

Color optical scanners produce color image data signals representative of an object or document being scanned by projecting an image of the object or document onto an optical photo sensor array. The color image data signals may then be digitized and stored for later use. For example, the color image data signals may be used by a personal computer to produce an image of the scanned object on a suitable display device, such as a CRT.

A typical optical scanner comprises illumination and optical systems to illuminate the object and focus a small area of the illuminated object, usually referred to as a "scan line," onto the photo sensor array. The entire object is then scanned by sweeping the illuminated scan line across the entire object, either by moving the object with respect to the illumination and optical assemblies or by moving the illumination and optical assemblies relative to the object.

A typical illumination system for a color scanner may include a suitable white light source, such as a fluorescent or incandescent lamp, to illuminate the object. A typical optical system may include a lens assembly to focus the image of the illuminated scan line onto the surface of the optical photo sensor array and may also include one or more mirrors to "fold" the path of the light beam, thus allowing the optical system to be conveniently mounted within a relatively small enclosure.

While various types of photo sensor devices may be used to detect the light from the illuminated scan line, a commonly used sensor is the charge coupled device or CCD. A typical CCD may comprise a large number of individual cells or "pixels," each of which collects or builds-up an electrical charge in response to exposure to light. Since the size of the accumulated electrical charge in any given cell or pixel is related to the intensity and duration of the light exposure, a CCD may be used to detect light and dark spots on an image focused thereon. In a typical scanner application, the charge built up in each of the CCD cells or pixels is measured and then discharged at regular intervals known as sampling intervals, which may be about 5 milliseconds or so for a typical scanner.

Color optical scanners of the type described above usually operate by collecting multiple color component images of the object being scanned. For example, data representative of red, green, and blue color components of the image of the scan line may be produced, correlated, and stored by the scanner apparatus. The particular color components, e.g., red, green, and blue, are commonly referred to as primary colors, primary stimuli, or simply, primaries.

As is well-known, various combinations of three such primary colors can be used to produce any color stimulus contained within the gamut of colors on the CIE chromaticity diagram that lie within the triangle of primaries. The amounts of each primary color required to match a particular color stimulus are referred to as tristimulus values. Written mathematically: $C=r(R)+g(G)+b(B)$ Put in other words, a given color stimulus C (e.g., the image of the scan line) can be matched by r units of primary stimulus R(red), g units of primary stimulus G (green), and b units of primary stimulus B (blue). All the different physical stimuli that look the same as the given color stimulus C will have the same three tristimulus values r, g, and b. Thus, it is possible to match a color stimulus by a mixture of three primary colors or stimuli, with the tristimulus values r, g, and b determining the required amount of each primary color. It is important to keep in mind that the foregoing method will only achieve psycho physical color match (i.e., the color will appear the same to the human eye), as opposed to a physical or spectral match.

Many different techniques have been developed for collecting data representative of multiple color component images (i.e., the tristimulus values) of the object being scanned. One technique is to project the image of the illuminated scan line onto a single linear photo sensor array. However, in order to collect the multiple color component images (i.e., the tristimulus values) of the illuminated scan line, a different color light source (a primary) is used to illuminate the scan line on each of three scanning passes. For example, the object first may be scanned using only red light, then only green light, and finally only blue light. The output signal from the photo sensor for each color thus represents the tristimulus value for that color. In a variation of this technique, three scanning passes may be made using a white light source, but the light from the illuminated scan line is filtered by a different color filter during each of the three passes before being focused onto the optical photo sensor array. Either way, the tristimulus values for the primaries (i.e., the red, green, and blue colors) may be determined from the output signal of the photo sensor.

Another technique, described in U.S. Pat. No. 4,709,144 issued to Vincent and U.S. Pat. No. 4,926,041, issued to Boyd, et al., both of which are hereby specifically incorporated by reference for all that is disclosed therein, is to split the illuminated (i.e., polychromatic) scan line into multiple color component beams, each of which are then focused onto multiple linear photo sensor arrays. For example, the illuminated scan line may be split into red, green, and blue color component portions which are then simultaneously projected onto three (3) separate linear photo sensor arrays. The output from each photo sensor represents the tristimulus value for the corresponding primary. This technique allows the tristimulus values from any particular scan line to be generated simultaneously, thus allowing easier correlation of the image data for each separate primary.

Regardless of the particular technique used to collect the tristimulus values, the color accuracy of the reproduced image will be only as good as the spectral band match between the spectral sensitivity of the photo sensor used to record the image and the spectral sensitivity for human vision. As is well-known, the human eye comprises three different kinds of color receptors (cones) that are sensitive to various spectral bands or regions that roughly correspond to red, green, and blue light. The receptors are relatively "broad band" devices, sensitive to a wide range of wavelengths with each color band region. For example, blue receptors are typically sensitive to light having wavelengths ranging from about 400 nm to 500 nm; green receptors to light having wavelengths ranging from about 480 nm to 600 nm; and red receptors to light having wavelengths ranging from about 500 nm to 650 nm. While the specific sensitivities of the color receptors vary from person to person, the average response for each receptor has been quantified and is known as the "CIE standard observer."

One problem which continues to present challenges is associated with the fact that during scanning of an object, one of the scanner or the object is typically moving relative to the other. Accordingly, where exposure takes place in a sequential manner as, for example, with a single array sensor, transitions from one color to another color on the object (i.e., from black-to-white where, for example, a portion of a printed letter appears on a page) occurs at different times as seen by the sensor. Hence, a halo effect can be presented whereby the ultimately-rendered image, such as a printed image of the scanned object, will be seen to have a halo adjacent to the transition regions. Specifically, and with reference to FIG. 11, an enlarged CIS (Contact Image Sensor) scan of the word "You" appears. The word "You" was scanned from an object on which the letters were black and the background was white. The background, however, appears as yellow and there are vertical lines which run through much of this image. Each square in the image represents a single pixel value. A linear array of sensors view a horizontal line which cuts across the word "You" from left to right, then the line moves down (toward the bottom of the word) and scans another horizontal line. In this example, the top edge of the horizontal line (at the tops of the individual letters) appears as yellow. The bottom edge of the letters appear as blue. This is not the case for vertical lines defining the sides of the letters, which do not have a different color on the left side versus the right side. The above-described color artifact is undesirable because the ultimately-rendered image is not as accurately presented as is desirable.

Accordingly, this invention arose out of concerns associated with providing improved scanner assemblies, optical scanners, and methods of scanning color images.

SUMMARY OF THE INVENTION

Sensor assemblies, optical scanners, and methods of scanning color images are described. In one embodiment, a single array of sensor elements is provided. A light source assembly is positioned in proximity with the single array and is configured to illuminate an object with a plurality of different colors of light while at least one of the object or the single array moves with a velocity having a velocity profile relative to the other object or the single array. An illumination sequence processor is operably coupled with the light source assembly and is configured to assign individual colors of light for illumination on the object in accordance with variations in the velocity profile of the velocity with which the object or the array moves relative to the other.

In another embodiment, an array of sensor elements is provided. A light source assembly is positioned in proximity with the array and is configured to sequentially illuminate an object with a plurality of different colors of light. Responsive to such illumination, the array is configured to receive light which is sequentially reflected from an illuminated object, and to provide data which can be arranged into a plurality of color planes. The color planes are individually indicative of the sequentially reflected light. A color plane manipulation processor is operably coupled with the array and is configured to adjust the relative position of at least one of the color planes relative to another of the color planes. Accordingly, such provides improved color data describing portions of an object illuminated by the light source assembly.

In another embodiment, a method of scanning color images includes providing a single array of sensor elements. A multi-color light source assembly is provided and is positioned in proximity with the single array. At least one of an object or the single array is moved relative to the other of the object or the single array with a velocity having a velocity profile. The object is selectively illuminated using the multi-color light source assembly by providing sequenced individual colors of light in accordance with and responsive to variations in the velocity profile. Light reflected from the object is detected responsive to the illuminating thereof.

DESCRIPTION OF THE DRAWINGS

The file of this patent contains at least one photograph executed in color. Copies of this patent with color photograph(s) will be provided by the Patent and Trademark Office upon request and payment of necessary fee.

FIG. 8 is a graph of data, similar to FIG. 7, which represents a scan of a dark line with ideal shifting.

FIG. 9 is a view of data which represents a scan of a dark line after shifting in accordance with one embodiment of the present invention.

DETAILED DESCRIPTION OF THE INVENTION

Figure 1:
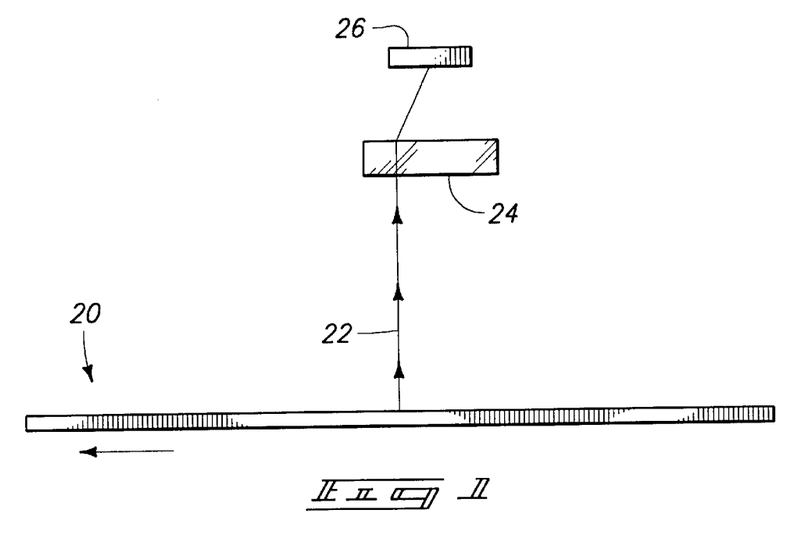
FIG. 1 is a simplified mechanical block diagram illustrating a line of an image focused onto a row of a sensor assembly.

FIG. 1 is a simplified mechanical block diagram illustrating a basic scanner configuration. There are numerous types of scanner configurations which are known. The various embodiments of the present invention can find use in a variety of these scanner configurations. Exemplary scanners are described in U.S. Pat. Nos. 5,773,814, 5,753,906, 5,642,197, 5,710,872, 5,745,607, and 5,483,053, the disclosures of which are incorporated by reference herein.

In FIG. 1, an object 20 is illuminated with a light source and light 22 which is reflected from object 20 is focused by a lens system 24 onto a sensor assembly 26. The sensor assembly can comprise one or more rows of sensor elements such as charge coupled devices (CCDs) or photo-transistors as the light detection devices.

Figure 2:
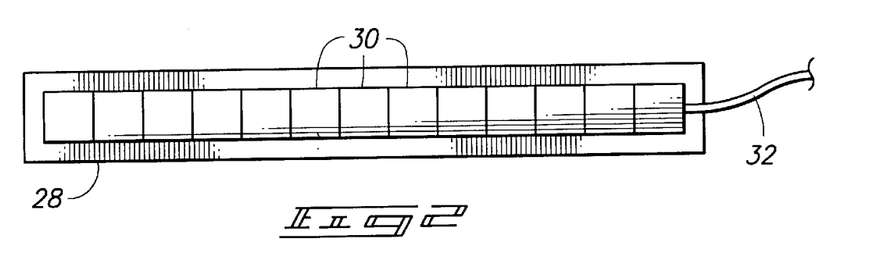
FIG. 2 is a simplified top plan view of a single array of sensor elements.

FIG. 2 is a simplified top plan view of a so-called single array sensor 28. Sensor 28 has a single row of sensor elements 30. Although only a few sensor elements are shown, typically a large number, e.g. 2000 to 7000, of sensor elements are provided in a row. A lead 32 is provided and connects with circuitry which is configured to process the image data provided by sensor 28. In some sensors, accumulated charge from each individual photo sensitive element is transferred to a corresponding capacitor for serial output. Capacitor voltages are then serially shifted out the signal leads so that for any one shift cycle, a voltage at a signal lead is a measurement of the light intensity received earlier by one photo sensitive element. Of course, other types of photo sensitive elements can be used.

Figure 3:
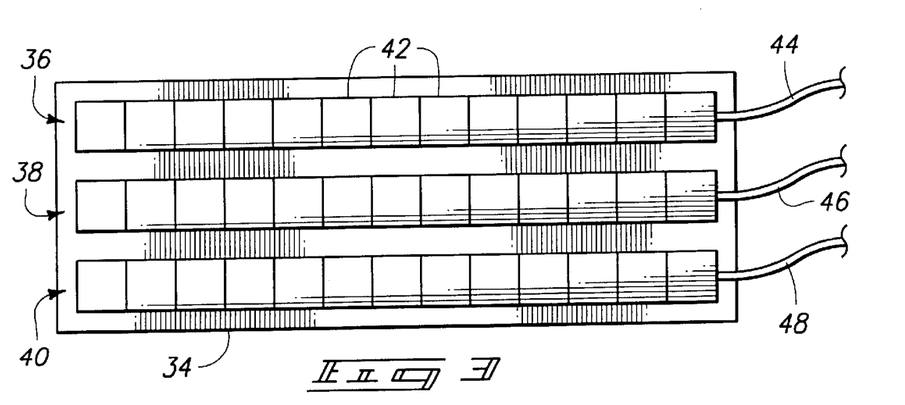
FIG. 3 is a simplified plan view of a multiple array of sensor elements.

FIG. 3 shows a simplified mechanical block diagram illustrating a basic multi-array sensor at 34. Sensor 34 includes three sensor array rows 36, 38, and 40. Each row has a plurality of individual sensor elements 42. Individual respective leads 44, 46, and 48 are provided for respective rows 36, 38, and 40. The principles upon which multi-array sensor 34 operates are described in U.S. Pat. No. 5,773,814 which is incorporated by reference above.

Figure 4:
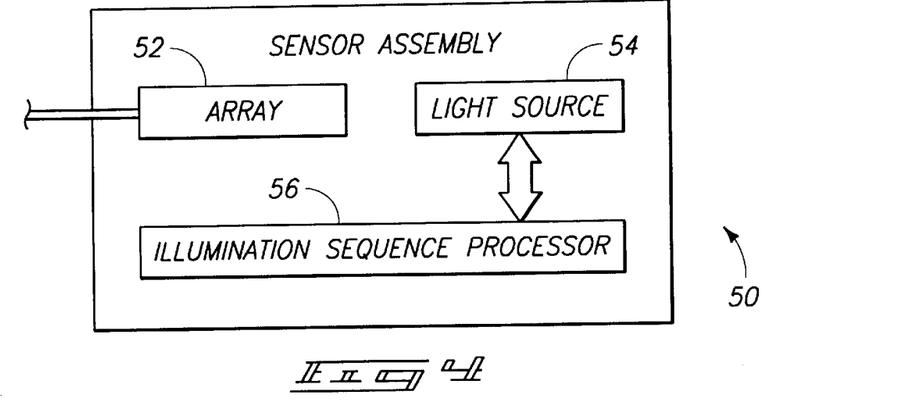
FIG. 4 is a high level block diagram of a sensor assembly in accordance with one embodiment of the invention.
Figure 4B:
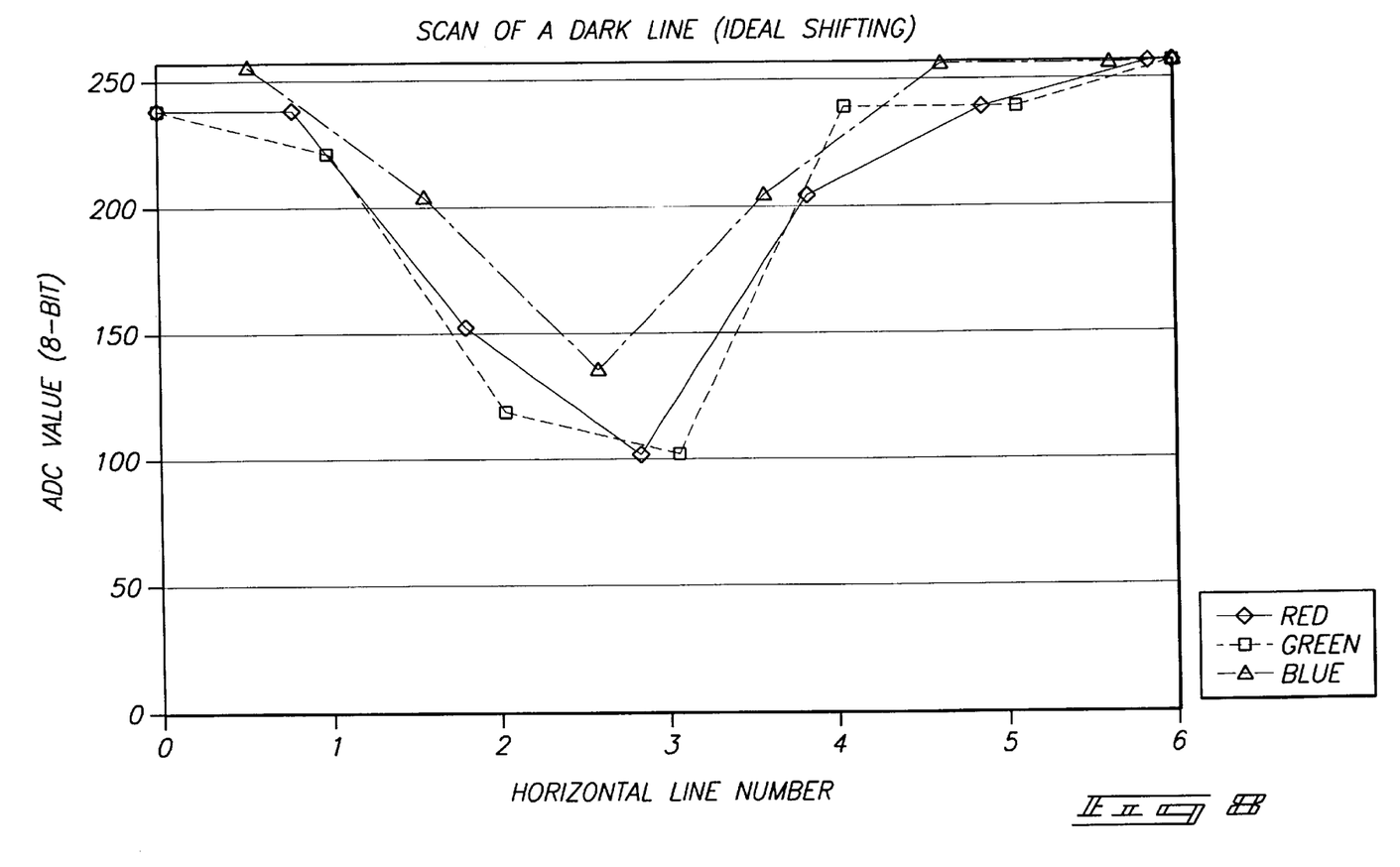

FIG. 4 shows a sensor assembly for a color optical image scanner in accordance with one embodiment of the present invention. Sensor assembly 50 includes an array of sensor elements 52 which, in a preferred embodiment, comprises a single array of sensor elements such as the one shown in FIG. 2.

Other arrays can, of course, be used. A light source assembly 54 is provided and positioned in proximity with array 52. Light source assembly 54 is preferably configured to illuminate an object with a plurality of different colors of light. Illumination takes place preferably while at least one of the object or the array is moved with a velocity having a velocity profile relative to the other. For example, in some systems it is common for the object being scanned to be moved relative to a stationary array. In other systems, it is common for the array to be moved relative to a stationary object being scanned. In a preferred embodiment, the object is moved relative to a stationary array.

An illumination sequence processor 56 is provided and is operably coupled with light source assembly 54. Preferably, illumination sequence processor 54 is configured to assign individual colors of light for illumination on an object in accordance with variations in the velocity profile of the velocity with which either the object or array is moved relative to the other. The illumination sequence processor can be implemented in any suitable hardware, software or firmware. In one embodiment, the illumination sequence processor is a suitably programmed microprocessor.

In many systems, a stepper motor is used to move an object, such as a piece of paper, relative to an array of sensor elements. The stepper motor, because of the mechanics involved with moving the object, can tend to move the object at a velocity which is non-uniform. Accordingly, variations in the velocity profile of the object during scanning operations can exist. These variations in the velocity profile can affect the ultimately-rendered displayed image. Hence, in accordance with one embodiment of the invention, variations in the velocity profile of the velocity of either the object or the array are recognized and determined, and thereafter compensated for by exposing certain colors of light during certain portions of the velocity profile. Determinations in the velocity profile can be, and preferably are made by the illumination sequence processor.

Figure 5:
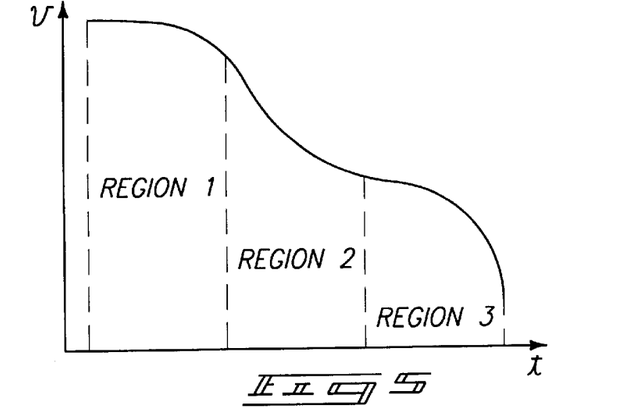
FIG. 5 is an exemplary graph of a velocity profile to assist in understanding certain aspects of the invention.

FIG. 5 shows an exemplary graph of a velocity profile which varies during a portion of the time during which an object is illuminated. The illustrated velocity profile is presented for explanation purposes only. Other velocity profiles can, of course, exist. Such velocity profiles can vary as between different stepper motors, and can vary as between different scan lines of the same stepper motor. The illustrated velocity profile represents the variations in the velocity of an object which exist during a time when one scan line of data is collected. As shown in the figure, three distinct regions exist which have different velocities. Region 1 is characterized as having a greater velocity than either of Regions 2 or 3. Region 2 has a velocity which is less than that of Region 1, but which is greater than that of Region 3. Region 3 has a velocity which is less than either of Regions 1 and 2.

In one embodiment of the invention, the illumination sequence processor 56 (FIG. 4) is configured to determine a region within the velocity profile having a greater velocity than another region. Thereafter, illumination sequence processor 56 can assign a color to which the human eye is generally less sensitive for illumination during the region having the greater velocity. Doing so ensures that lesser sensitive colors are used for illumination during periods of time when the relative velocity between the object and the array is greater. This, in turn, carries with it advantages which include a reduction in the undesirable color artifacts discussed above in connection with FIG. 11.

In another embodiment, illumination sequence processor 56 determines a region within the velocity profile having a lesser velocity than another region within the velocity profile. The illumination sequence processor can then assign a color to which the human eye is generally more sensitive for illumination during the region having the lesser velocity. As a result, the image will look sharper and reductions in undesirable color artifacts, such as those artifacts shown in FIG. 11, can be achieved.

In yet another embodiment, light source assembly 54 is configured to illuminate an object with three different colors to which the human eye has generally different sensitivities. The illumination sequence processor 56 is preferably configured to assign higher-sensitivity colors for illumination during regions having lesser velocities. In this example, Region 3 of FIG. 5 is a region during which the most sensitive color is used for illumination. Region 1, on the other hand, is the region during which the least sensitive color is used for illumination. Region 2 is then used for illumination with the color having the middle sensitivity. In a preferred embodiment, the three colors used for illumination by the light source assembly 54 are red, green and blue. The human eye is most sensitive to the color green; has a comparatively lower sensitivity to the color red; and a lowest sensitivity to the color blue. In this example, an object would be illuminated with the color blue during Region 1. The color red would be used to illuminate the object during Region 2. The color green would be used to illuminate an object during Region 3. In this manner, the most sensitive colors are used to illuminate an object during the times of the slowest velocity. This ensures that the ultimately-rendered image is more accurately perceived by the human eye.

In accordance with another embodiment, illumination sequence processor 56 is configured to determine various regions within the velocity profile having different velocities (FIG. 5). Illumination sequence processor 56 is also configured to assign a first of the colors to which the human eye is generally least sensitive for illumination during a region having a first velocity. Illumination sequence processor 56 is also preferably configured to assign a second of the colors to which the human eye is generally more sensitive than the first color for illumination during a region having a second velocity which is less than the first velocity. Preferably, illumination sequence processor 56 is configured to assign a third of the colors to which the human eye is generally more sensitive than the second color for illumination during a region having a third velocity which is less than a second velocity. In a most preferred embodiment the first color comprises blue, the second color comprises red, and the third color comprises green.

Figure 6:
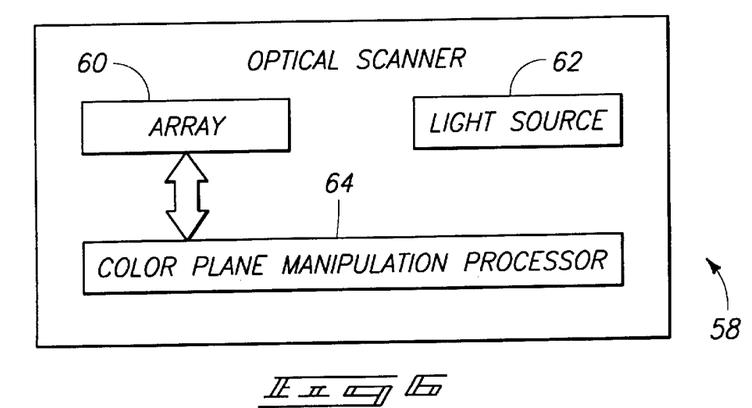
FIG. 6 is a high level block diagram of an optical scanner in accordance with one embodiment of the invention.

FIG. 6 shows an optical scanner in accordance with another embodiment of the invention generally at 58. An array 60 of sensor elements is provided. Array 60 can be a single array or a multiple-array of sensor elements such as those described above in connection with FIGS. 2 and 3. A light source assembly 62 is provided and is positioned in proximity with array 60. Preferably, light source assembly 62 is configured to sequentially illuminate an object with a plurality of different colors of light. Responsive to such illumination, array 60 is configured to receive light sequentially reflected from an illuminated object, and to provide data which can be arranged into a plurality of color planes which are individually indicative of the sequentially reflected light. The term "color plane" refers to a single color component's image plane. The scanned image is formed in a two-dimensional plane, with one plane typically being horizontal across the image sensor, and the second plane being formed by motion between the sensor array and the object being scanned. For a scanner that scans images three times, e.g. once in red, once in green, and once in blue, there are really three color planes, i.e. the red color plane image, the green color plane image, and the blue color plane image. Each color plane usually represents the color data in a similar manner. The original image is represented by a combination of these color planes. The data defining the color planes is preferably placed into suitable memory locations.

A color plane manipulation processor 64 is provided and is operably coupled with array 60. Color plane manipulation processor 64 is preferably configured to adjust the relative position of at least one of the color planes relative to another of the color planes to provide improved color data describing portions of an object illuminated by light source assembly 62. The color plane manipulation processor can be implemented in any suitable hardware, software, or firmware. Preferably, the color plane manipulation processor is a suitably programmed microprocessor and manipulation of the color plane data takes place through interpolation which can be either linear interpolation or a higher order interpolation. Of course, other mathematical operations can be used to manipulate the color plane data in a way which is within the spirit and scope of the invention.

In one embodiment, color plane manipulation processor 64 is configured to adjust the relative position of two color planes relative to a third color plane.

In another embodiment, color plane manipulation processor 64 is configured to adjust the relative position of two color planes relative to a third color plane, wherein one of the two color planes corresponds to a color to which the human eye is less sensitive than a color plane to which the third color plane corresponds.

In another embodiment, color plane manipulation processor 64 is configured to adjust the relative position of two color planes relative to the third color plane. Preferably both of the two color planes correspond to colors to which the human eye is less sensitive than a third color to which the third color plane corresponds.

In another embodiment, light source assembly 62 is configured to sequentially illuminate an object with a plurality of different colors comprising red, green, and blue. Here, color plane manipulation processor 64 is configured to adjust the relative position of a color plane corresponding to one of the red and blue colors relative to a color plane corresponding to the green color.

In yet another embodiment where the different colors comprise red, green, and blue, color plane manipulation processor 64 is configured to adjust a relative position of two color planes relative to a third color plane.

In another embodiment where the different colors comprise red, green, and blue, color plane manipulation processor 64 is configured to adjust the relative position of the color planes corresponding to both red and blue relative to a color plane corresponding to green.

Figure 7:
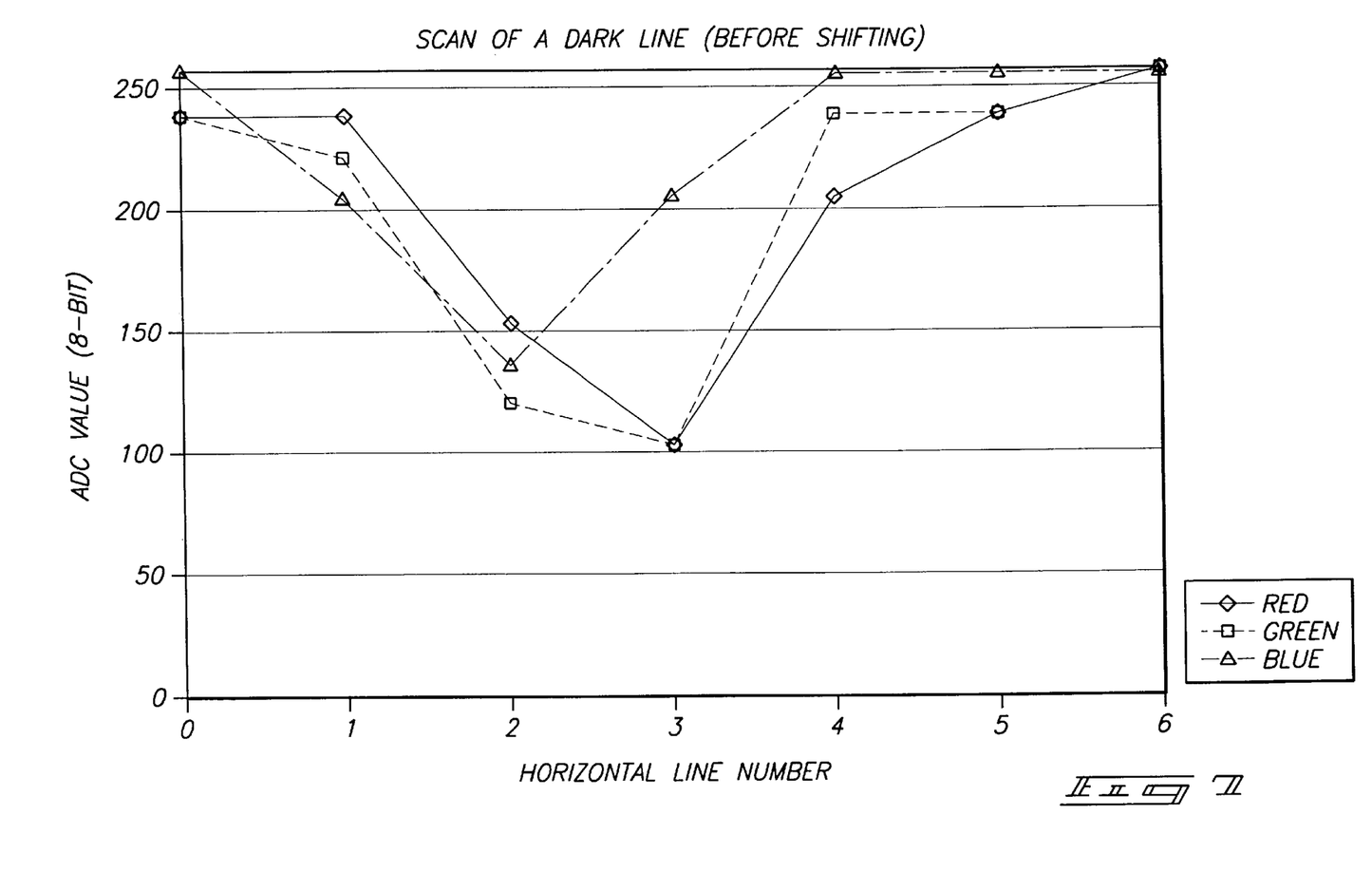
FIG. 7 is a graph of data which represents a scan of a dark line before shifting in accordance with one embodiment of the invention.

To assist in understanding various embodiments of the FIG. 6 optical scanner, the reader is referred to FIGS. 7–9.

FIGS. 7–9 correspond to data which is representative of a scan conducted of a dark line. Such dark line can represent a transition between a white background and the beginning of a letter, such as the top of the letters "You." The Y-axis is the ADC value, which is a eight-bit value. Typically this value is received from an analog-to-digital converter (ADC) which digitizes the analog signal from the optical sensor. A "0" value on the Y-axis is associated with the color black. A "255" value on the Y-axis is associated with the color white. Various shades there between are associated with the numerical values which extend between "0" and "255". The horizontal axis corresponds to the horizontal line number which represents data collected by an individual scan line.

FIG. 7 shows a graph of three RGB colors which are exposed during the scan of the dark line before shifting, in accordance with the prior art. An example dark or black line would be the top center of the letter "o" in the word "You". The graph indicates the values from the sensor element that travels down the page (top-to-bottom) and traverses through the center of the letter "o". Horizontal line number 0 appears above the letter "o". On line 0, the graph indicates that the color blue was found to have an amplitude of 255, and both the green and red colors had an amplitude of 238. On the next line down (line 1), the sensor started to notice the top of the letter "o", i.e. the color blue had dropped to 204, the color green had dropped to 221, and the color red had not yet changed. On the next line down (line 2), the sensor picked up the top of the "o", with the color blue dropping to 136, the color green dropping to 119, and the color red dropping to 153. The top of the letter "o" was passed by the sensor by line 5 where the sensor indicates values similar to those prior to sensing the "o" at line 0.

FIG. 8 shows a graph of the RGB colors which correspond to an ideal shifting of the color planes. An ideal shifting of the color planes can be considered as being one in which the blue and red lines are shifted by a fractional amount in the horizontal direction. Accordingly, the lines would all have minimums at about the same place, but would no longer be defined by samples of color at the same locations. Most systems, however, require that the color data be sampled at the same place on the image. For example, the color green is the only color which is sampled on the horizontal line number at integer locations. Although the red and blue curves are desirably positioned on this graph, the sample points that define these lines are not located at integer line numbers.

FIG. 9 shows a graph of a scan in which color plane shifting has taken place in accordance with one or more embodiments of the invention. A comparison between FIGS. 7, 8, and 9 indicates that FIG. 9 is closer to an ideal shifting (FIG. 8) than to FIG. 7. Accordingly, the ultimately rendered images is more accurately presented when color plane manipulation takes place in accordance with one or more embodiments of the invention. Here, the ideal shifted lines of FIG. 8 are re-sampled on integer values of the horizontal line number axis. In FIG. 8, the color blue has a value of 204 between lines 1 and 2, which value drops to 136 between lines 2 and 3. The value at which a straight line between these two points crosses above the horizontal line number 2 is approximately 173. In this example, the value is determined by a straight line between the data points and therefore represents linear interpolation. Other curve fitting techniques could, of course, be used, e.g. spline, quadratic, exponential and the like.

Figure 10:
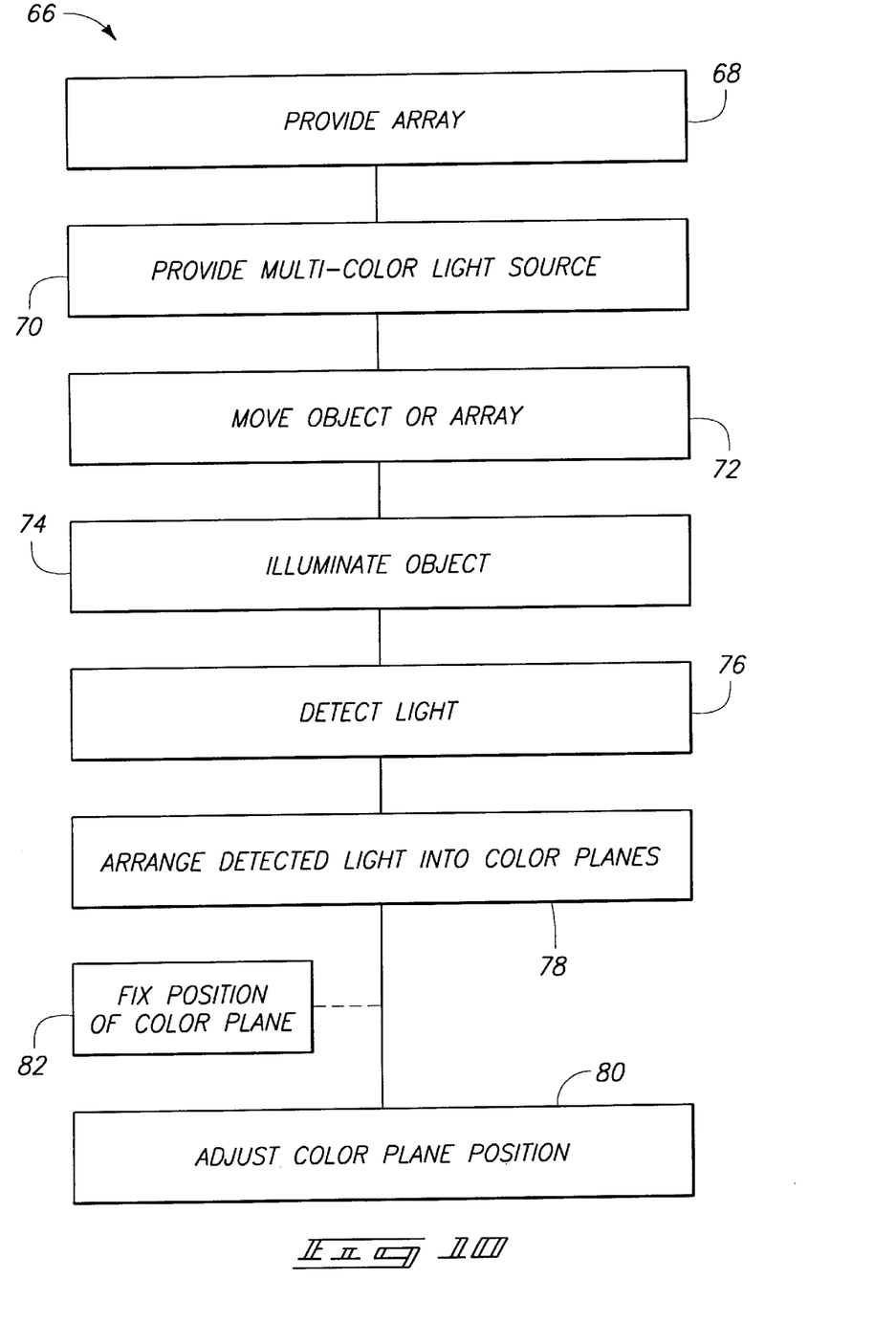
FIG. 10 is a flow diagram which describes method steps in accordance with one or more embodiments of the invention.

FIG. 10 shows a flow diagram which illustrates various methodical steps of scanning color images which can be implemented in a color optical image scanner. At 68, an array of sensor elements is provided. Preferably, such array comprises a single array of sensor elements such as the one shown in FIG. 2. At 70, a multi-color light source assembly is provided and is positioned in proximity with the array. At 72, at least one of an object to be scanned or the single array is moved relative to the other at a velocity having a velocity profile. At 74 the object is selectively illuminated using a multi-color light source assembly by providing sequenced individual colors of light in accordance with and responsive to variations in the velocity profile. At 76, light reflected from the object is detected responsive to the illumination thereof.

In one embodiment, the selective illumination of the object comprises assigning a color to which the human eye is generally less sensitive for illumination during a region of the velocity profile having a greater velocity.

In another embodiment, the multi-color light source is configured to illuminate an object with three different colors to which the human eye has generally different sensitivities. The selective illumination of the object comprises assigning higher-sensitivity colors for illumination during lesser velocity regions of the velocity profile.

In another embodiment, the multi-color light source is configured to illuminate an object with three different colors to which the human eye has generally different sensitivities. The selective illumination of the object comprises determining various regions within the velocity profile having different velocities. Colors are assigned in accordance with variations in the velocity profile.

In a preferred embodiment, a first of the colors to which the human eye is generally sensitive is assigned for illumination during a region having a first velocity. A second of the colors to which the human eye is generally more sensitive than the first color is assigned for illumination during a region having a second velocity which is less than the first velocity. The third of the colors to which the human eye is generally more sensitive than the second color is assigned for illumination during a region having a third velocity which is less than the second velocity.

In another embodiment, light which is reflected from the illuminated object is arranged, at 78, into a plurality of color planes which are individually indicative of the reflected light. At 80, the relative position of at least one of the color planes is adjusted relative to another of the color planes to provide improved color data describing portions of the object illuminated by the light source assembly. Manipulation of the color planes preferably takes place as described above.

In a preferred embodiment, the relative position of the color plane corresponding to the color to which the human eye is most sensitive is fixed at 82. Thereafter, at 80, the relative position of at least one of the color planes to which the human eye is not most sensitive is adjusted to provide improved color data describing portions of the object illuminated by the light source assembly.

Figure 11:
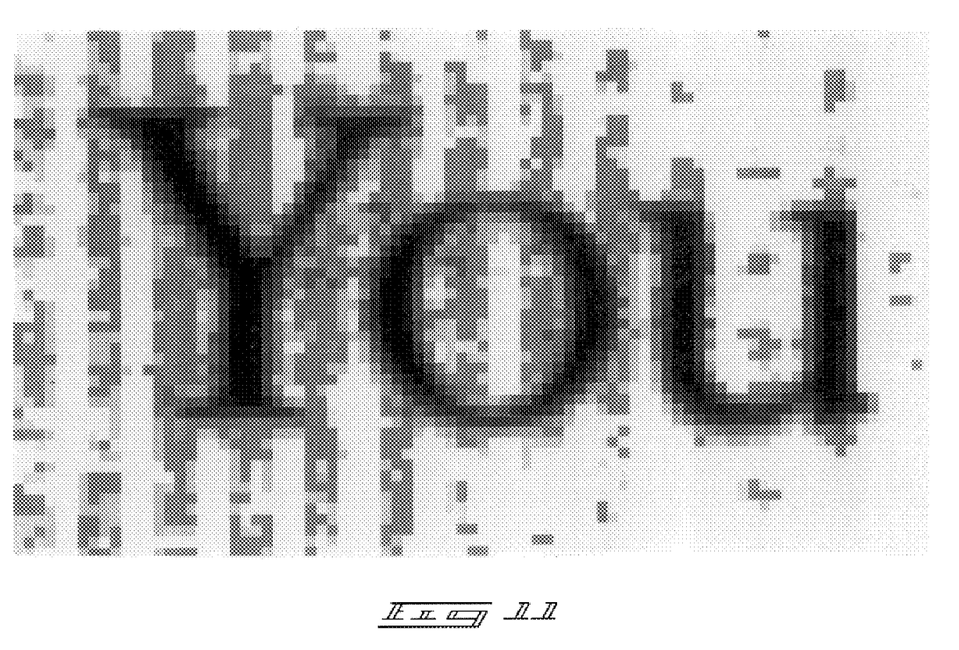
FIG. 11 is a photograph of a CIS scan of the word "You" in accordance with the prior art.
Figure 12:
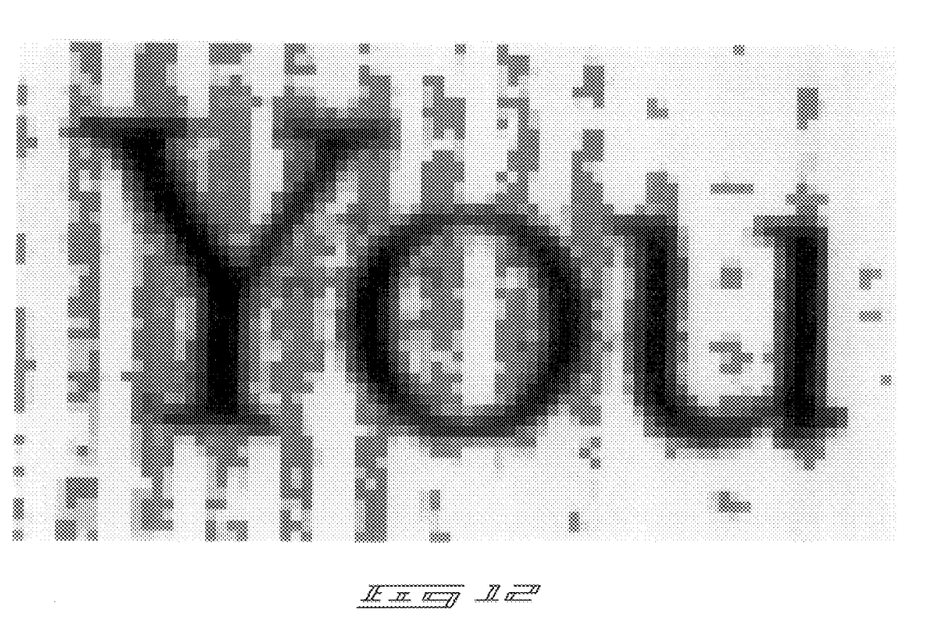
FIG. 12 is a photograph of a CIS scan of the word "You" in accordance with one or more embodiments of the present invention.

Advantages provided by the various embodiments described above include that color artifacts of scanned or color-copied images can be reduced. For example, FIG. 12 is a photograph of a CIS scan of the word "You" which is similar to the photograph of FIG. 11. Here, however, the red and blue color planes have been shifted with linear interpolation. The red color data has been re-sampled to the right by 22% of the horizontal row spacing. Put another way, in this example, each new red data point is linearly interpolated to a point which is 22% of the horizontal line width to the right. The color blue is similarly treated. Specifically, the blue color data is re-sampled to the left by 54% of a horizontal line width. Put another way, in this example, each new blue data point is linearly interpolated to a point which is 54% of the horizontal line width to the left.

This is particularly useful in the context of single array color sensors. In addition, better vertical alignment can be achieved, particularly when scanned or color copies of lines or regions such as horizontal black lines on a white background are made. This, in turn, reduces color artifacts which have shown up, in the past, as different colors above and below the line, and as illustrated in FIG. 11.

The protection sought is not to be limited to the disclosed embodiments, which are given by way of example only, but instead is to be limited only by the scope of the appended claims.

What is claimed is:

1. A sensor assembly for a color optical image scanner comprising:
    a single array of sensor elements;
    a light source assembly positioned in proximity with the single array and configured to illuminate an object with a plurality of different colors of light while at least one of the object or the single array moves with a velocity having a velocity profile relative to the other of the object or the single array; and
    an illumination sequence processor operably coupled with the light source assembly and configured to assign individual colors of light for illumination on an object in accordance with variations in the velocity profile of the velocity with which the one of the object or the single array moves relative to the other of the object or the single array.

2. The sensor assembly of claim 1, wherein the illumination sequence processor is configured to:
    determine a region within the velocity profile having a greater velocity than another region within the velocity profile; and
    assign a color to which the human eye is generally less sensitive for illumination during the region having the greater velocity.

3. The sensor assembly of claim 1, wherein the illumination sequence processor is configured to:
    determine a region within the velocity profile having a lesser velocity than another region within the velocity profile; and
    assign a color to which the human eye is generally more sensitive for illumination during the region having the lesser velocity.

4. The sensor assembly of claim 1, wherein the plurality of different colors comprise three colors to which the human eye has generally different sensitivities, and the velocity profile has various regions of different velocities, and wherein the illumination sequence processor is configured to assign higher-sensitivity colors for illumination during regions having lesser velocities.

5. The sensor assembly of claim 4, wherein the different colors comprise red, green, and blue.

6. The sensor assembly of claim 1, wherein the plurality of different colors comprise three colors to which the human eye has generally different sensitivities, and wherein the illumination sequence processor is configured to:
   determine various regions within the velocity profile having a different velocities; and
   assign (a) a first of the colors to which the human eye is generally least sensitive for illumination during a region having a first velocity, (b) a second of the colors to which the human eye is generally more sensitive than the first color for illumination during a region having a second velocity which is less than the first velocity, and (c) a third of the colors to which the human eye is generally more sensitive than the second color for illumination during a region having a third velocity which is less than the second velocity.

7. The sensor assembly of claim 6, wherein the first color comprises blue, the second color comprises red, and the third color comprises green.

8. An optical scanner comprising:
   an array of sensor elements;
   a light source assembly positioned in proximity with the array and configured to sequentially illuminate an object with a plurality of different colors of light and responsive thereto, the array being configured to receive light sequentially reflected from an illuminated object and to provide data which can be arranged into a plurality of color planes which are individually indicative of the sequentially reflected light; and
   a color plane manipulation processor operably coupled with the array and configured to adjust the relative position of at least one of the color planes relative to another of the color planes to provide improved color data describing portions of an object illuminated by the light source assembly.

9. The optical scanner of claim 8, wherein the color plane manipulation processor is configured to adjust the relative position of two color planes relative to a third color.

10. The optical scanner of claim 8, wherein the color plane manipulation processor is configured to adjust the relative position of two color planes relative to a third color plane, one of said two color planes corresponding to a color to which the human eye is less sensitive than a color to which the third color plane corresponds.

11. The optical scanner of claim 8, wherein the color plane manipulation processor is configured to adjust the relative position of two color planes relative to a third color plane, both of said two color planes corresponding to colors to which the human eye is less sensitive than a color to which the third color plane corresponds.

12. The optical scanner of claim 8, wherein the plurality of different colors comprise red, green, and blue, and wherein the color plane manipulation processor is configured to adjust a relative position of a color plane corresponding to one of red and blue relative to a color plane corresponding to green.

13. The optical scanner of claim 8, wherein the plurality of different colors comprise red, green, and blue, and wherein the color plane manipulation processor is configured to adjust a relative position of color planes corresponding to red and blue relative to a color plane corresponding to green.

14. The optical scanner of claim 8, wherein the plurality of different colors comprise red, green, and blue, and wherein the color plane manipulation processor is configured to adjust a relative position of two color planes relative to a third color plane.

15. In a color optical image scanner, a method of scanning color images comprising:
   providing a single array of sensor elements;
   providing a multi-color light source assembly positioned in proximity with the single array;
   moving at least one of an object or the single array relative to the other of the object or the single array at a velocity having a velocity profile;
   selectively illuminating the object using the multi-color light source assembly by providing sequenced individual colors of light in accordance with and responsive to variations in said velocity profile; and
   detecting light reflected from the object responsive to illuminating the object.

16. The method of claim 15, wherein the selectively illuminating of the object comprises assigning a color to which the human eye is generally less sensitive for illumination during a region of the velocity profile having a greater velocity.

17. The method of claim 15, wherein the multi-color light source is configured to illuminate an object with three different colors to which the human eye has generally different sensitivities, and wherein the selectively illuminating of the object comprises assigning higher-sensitivity colors for illumination during lesser velocity regions of the velocity profile.

18. The method of claim 15, wherein the multi-color light source is configured to illuminate an object with three different colors to which the human eye has generally different sensitivities, and wherein the selectively illuminating of the object comprises:
   determining various regions within the velocity profile having different velocities; and
   assigning (a) a first of the colors to which the human eye is generally sensitive for illumination during a region having a first velocity, (b) a second of the colors to which the human eye is generally more sensitive than the first color for illumination during a region having a second velocity which is less than the first velocity, and (c) a third of the colors to which the human eye is generally more sensitive than the second color for illumination during a region having a third velocity which is less than the second velocity.

19. The method of claim 15 further comprising:
   arranging detected light reflected from the object into a plurality of color planes which are individually indicative of the reflected light; and
   adjusting the relative position of at least one of the color planes relative to another of the color planes to provide improved color data describing portions of the object illuminated by the light source assembly.

20. The method of claim 15, wherein the multi-color light source is configured to illuminate an object with three different colors to which the human eye has generally different sensitivities, and further comprising:
   arranging detected light reflected from the object into a plurality of color planes which are individually indicative of the reflected light and which correspond to the three different colors;
   fixing the relative position of the color plane corresponding to the color to which the human eye is most sensitive; and adjusting the relative position of at least one of the color planes to which the human eye is not most sensitive relative to the color plane corresponding to the color to which the human eye is most sensitive to provide improved color data describing portions of the object illuminated by the light source assembly.

* * * * *